April 19, 1960  J. V. HAMMOND  2,933,178
CONVEYOR
Filed June 12, 1958  3 Sheets-Sheet 1
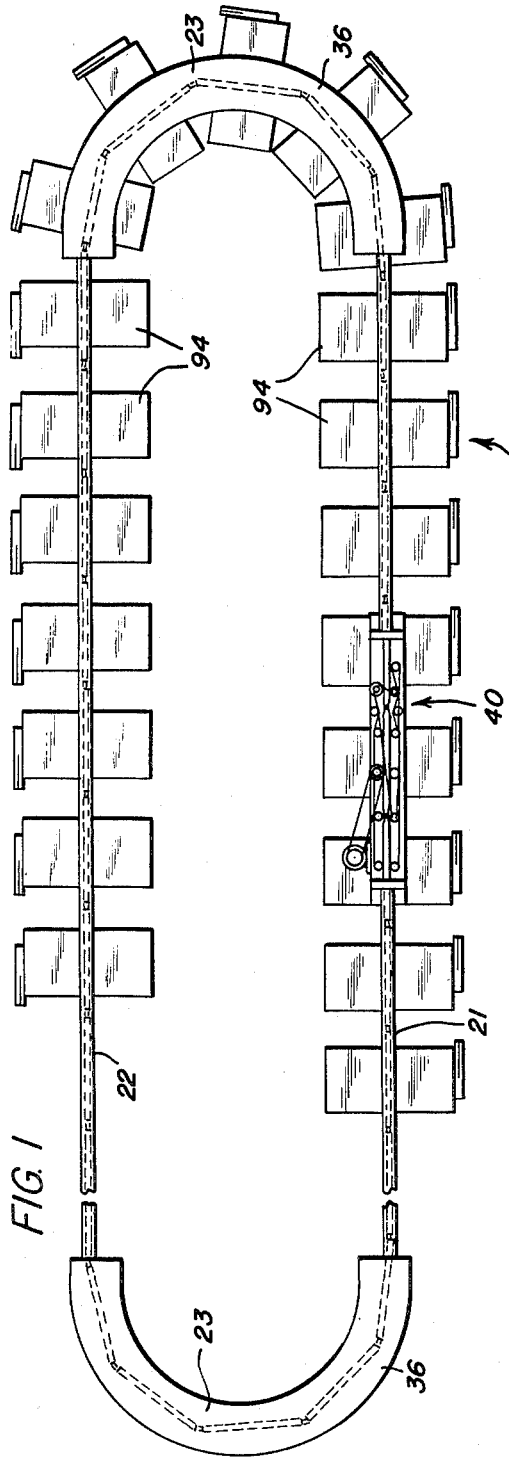
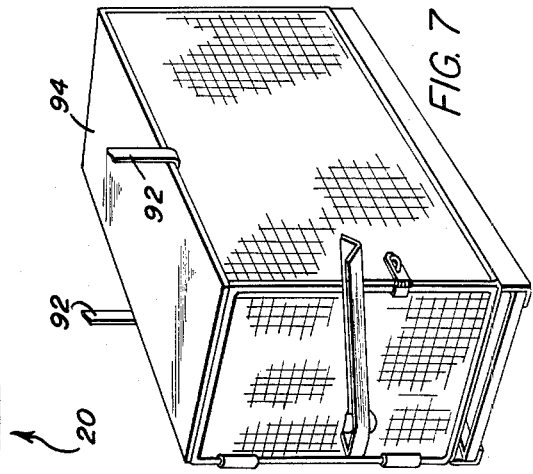
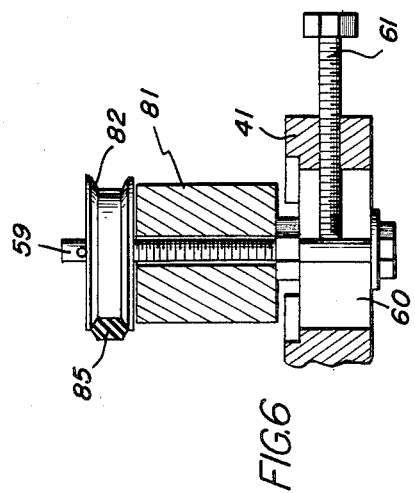
INVENTOR
JOHN V. HAMMOND
BY Kimmel & Crowell
ATTORNEYS

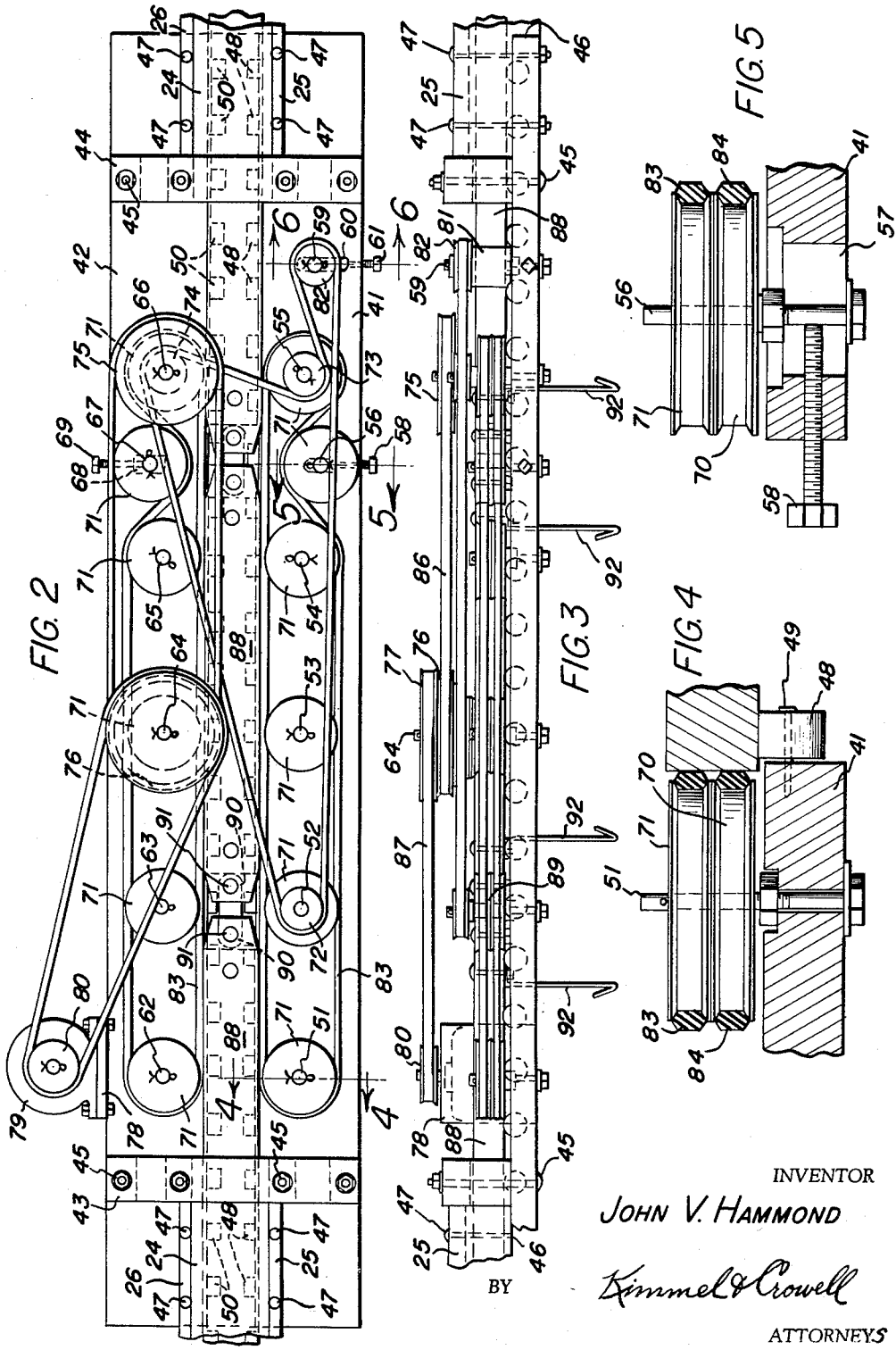

April 19, 1960     J. V. HAMMOND     2,933,178
CONVEYOR
Filed June 12, 1958                         3 Sheets-Sheet 3
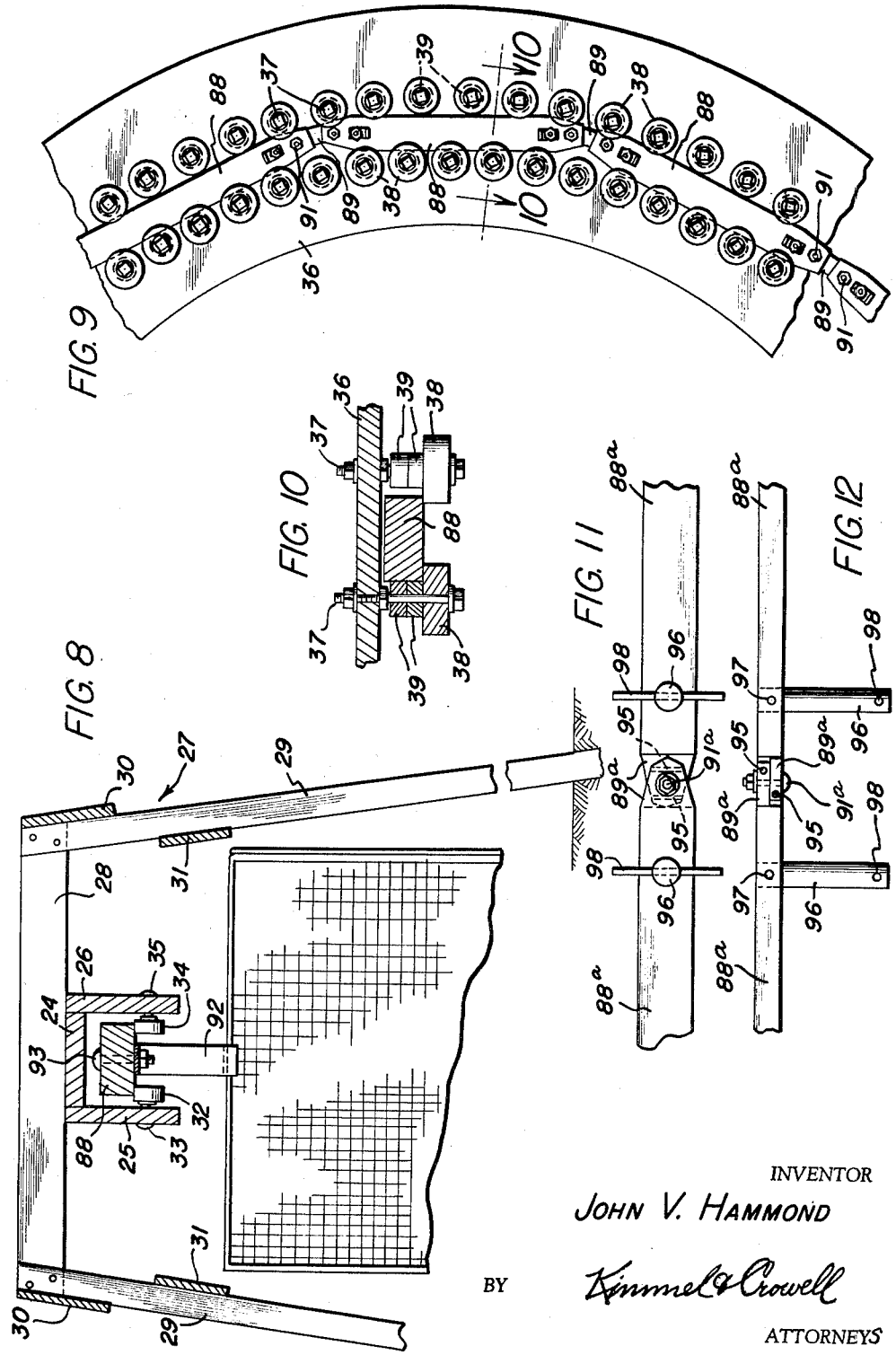
INVENTOR
JOHN V. HAMMOND
BY Kimmel & Crowell
ATTORNEYS United States Patent Office 2,933,178
Patented Apr. 19, 1960

2,933,178

CONVEYOR

John V. Hammond, Spangler, Pa.

Application June 12, 1958, Serial No. 741,602

3 Claims. (Cl. 198—203)

The present invention relates to conveyors, and particularly to conveyors of the endless type.

The primary object of the invention is to provide a conveyor and drive system therefor to permit endless operation of the conveyor.

Another object of the invention is to provide a friction drive for a conveyor through direct contact of the driving means with the conveyor elements.

A further object of the invention is to provide a conveyor of the class described above having means for supporting a load suspended therebeneath.

A still further object of the invention is to provide a conveyor of the class described above in which the conveyor elements are relatively long and are hingedly connected together.

Another object of the invention is to provide a conveyor of the class described above which is inexpensive to manufacture, simple to operate, and which is efficient in handling loads in relatively confined spaces.

Other objects and advantages will become apparent in the following specification when considered in the light of the attached drawings, in which:

Figure 1 is a fragmentary top plan view of the invention.

Figure 2 is a grossly enlarged fragmentary top plan view of the invention.

Figure 3 is a fragmentary side elevation of the structure illustrated in Figure 2.

Figure 4 is an enlarged fragmentary vertical cross-section taken along the line 4—4 of Figure 2, looking in the direction of the arrows.

Figure 5 is an enlarged fragmentary vertical cross-section taken along the line 5—5 of Figure 2, looking in the direction of the arrows.

Figure 6 is an enlarged fragmentary vertical cross-section taken along the line 6—6 of Figure 2, looking in the direction of the arrows.

Figure 7 is a perspective view of a mink cage supported by the conveyor.

Figure 8 is a vertical cross-section taken through the conveyor illustrating one manner of supporting the conveyor track.

Figure 9 is a bottom plan view of a curved section of the conveyor.

Figure 10 is an enlarged fragmentary vertical cross-section taken along the line 10—10 of Figure 9, looking in the direction of the arrows.

Figure 11 is a bottom plan view of a modified form of the conveyor member.

Figure 12 is a fragmentary side elevation of the structure illustrated in Figure 11.

Referring now to the drawings in detail wherein like reference characters indicate like parts throughout the several figures, the reference numeral 20 indicates generally a conveyor system constructed in accordance with the invention.

The conveyor system 20 includes a generally straight run 21, a second generally straight run 22 arranged in spaced apart parallel relation to the run 21, and a pair of semi-circular portions 23 connecting the opposite ends of the straight runs 21, 22. The conveyor illustrated in Figure 1 is of a generally oval form, however, it should be understood that by following the teachings of this invention, the conveyor may be made to follow any desired tortuous path so long as the path is endless.

The relatively straight runs 21, 22 of the conveyor 20 each include an elongated horizontal top plate 24 and a pair of depending side plates 25, 26 secured at their upper edges to opposite sides of the plate 24. The plates 24, 25, 26 form an inverted U-shaped channelway which may be supported in any desired manner, such as the support indicated generally at 27 in Figure 8.

The support 27 includes a transversely extending generally horizontal beam 28 secured to the upper face of the plate 24 intermediate its opposite ends. Legs 29 have their upper ends secured to the opposite ends of the beam 28 to support the beam 28 in spaced relation above the ground. Braces 30 and 31 are secured to the legs 29 and extend between adjacent legs 29 on one side of the run 21 and the run 22.

The plate 25 has a plurality of equispaced support rollers 32 journalled thereon adjacent the lower edge thereof by means of a pivot bolt 33. The plate 26 has a plurality of horizontally equispaced rollers 34 journalled thereon adjacent the lower edge thereof on pivot bolts 35. The axes of the rollers 32, 34 are arranged in aligned relation parallel to the plate 24.

An arcuate horizontal plate 36 having a width somewhat greater than the horizontal plate 24 is arranged in aligned relation thereto in the semi-circular portions 23 of the endless conveyor 20. The plates 36 are provided with a plurality of bolts 37 arranged in depending relation in a pair of spaced apart arcuate rows. The bolts 37 each have a relative large roller 38 journalled on the lower end thereof and relatively small rollers 39 journalled thereon above the rollers 38.

The relatively straight section of conveyor 21 is provided with a conveyor drive section generally indicated at 40 and illustrated in detail in Figures 2 through 6. The conveyor drive section 40 includes a pair of spaced apart horizontal plates 41, 42 having their lower faces arranged in aligned relation with the lower edges of the side plates 25, 26. The plates 41, 42 are connected by a pair of transversely extending frames 43, 44 secured in spaced relation above the plates 41, 42 by means of bolts 45. The adjacent ends of the side plates 25, 26 are notched out at 46 to engage over the ends of the plates 41, 42, as seen in Figures 2 and 3, and are secured thereto by bolts 47 extending vertically therethrough.

The plate 41 is provided with a plurality of rollers 48 secured to the edge thereof adjacent the plate 42 on horizontally extending journal pins 49. The plate 42 is provided with a plurality of rollers 50 arranged in horizontally spaced relation along the edge of the plate 42 adjacent the plate 41. The rollers 48 and 50 are arranged in horizontally aligned relation to the rollers 32, 34, respectively.

The plate 41 is provided with a plurality of upstanding parallel shafts 51, 52, 53, 54 and 55 which extend through the plate 41 and are fixedly secured thereto. A shaft 56 extends through the plate 41 in a transversely extending slot 57 and a set screw 58 is threaded through one end of the slot 57 engaging the shaft 56 to move the shaft 56 inwardly of the plate 41 toward the plate 42.

A shaft 59 is mounted in an elongated transverse slot 60 in the plate 41 and a set screw 61 threaded through the end of the slot 60 is provided for adjusting the shaft 59 toward the plate 42.

The plate 42 is provided with a plurality of upstanding spaced apart parallel shafts 62, 63, 64, 65 and 66 fixedly secured to the plate 42 in opposed relation to the shafts 51, 52, 53, 54 and 55. A shaft 67 is mounted in an elongated transverse slot 68 formed in the plate 42 intermediate the shafts 65, 66, and in opposed relation to the shaft 56. A set screw 69 is threaded through the end of the slot 68 for adjusting the shaft 67 toward the plate 41.

A pair of superposed pulleys 70, 71 are journalled on each of the shafts 51, 52, 53, 54, 55, 56, 62, 63, 64, 65, 66 and 67. A somewhat smaller pulley 72 is journalled on the upper end of the shaft 52 and is fixedly secured to the pulleys 70, 71 journalled on the shaft 52 therebeneath. A pulley 73 is journalled on the upper end of the shaft 55 and fixedly secured to the pulleys 70, 71 journalled to the shaft 55 therebeneath.

A pulley 74 is journalled on the shaft 66 and fixedly secured to the pulleys 70, 71 journalled on the shaft 66 therebelow. A pulley 75 somewhat larger than the pulley 74 is journalled on the shaft 66 and fixedly secured to the pulley 74 so as to turn therewith. A pulley 76 is journalled on the shaft 64 in upwardly spaced relation from the pulleys 70, 71 thereon in horizontally aligned relation to the pulley 75. A somewhat larger pulley 77 is journalled on the shaft 64 above the pulley 76 and is fixedly secured to the pulley 76 to turn therewith.

An upright motor support board 78 is secured to the outer edge of the plate 42 and has a motor 79 rigidly secured thereto. A pulley 80 is mounted to the motor 79 and is arranged in aligned relation to the pulley 77.

The shaft 5 is provided with a spacer block 81 and a relatively small pulley 82 is journalled on the upper end of the shaft 59 in horizontally aligned relation to the pulleys 72, 73, and 74.

A pair of double tapered friction drive belts 83, 84 are trained about the pulleys 70, 71 mounted on the shafts 51, 52, 53, 54 and 55, and the pulleys 70, 71 on the shaft 56 engage the outer side of the belts 83, 84 so that by lateral movement of the shaft 56 in the slot 57, the tension of the belts 83, 84 may be controlled. The belts 83, 84 extend parallel to and closely adjacent the inner edge of the plate 41.

A second pair of belts 83, 84 of identical construction to the first pair thereof are trained about the pulleys 70, 71 on the shafts 62, 63, 64, 65 and 66, with the pulleys 70, 71 on the shaft 67 engaging the outer side thereof to adjust the tension on the belts 83, 84 on adjustment of the set screw 69.

A double tapered endless belt 85 is trained over the pulleys 72, 73, 74 and engages about the pulley 82 to provide a driving connection for the belts 83, 84 positioned above the plate 41. A drive belt 86 connects the pulleys 75, 76 to transmit power therebetween, and another drive belt 87 connects the pulleys 77 and 80 so that the motor 79 can transmit its power to the pairs of drive belts 83, 84.

A plurality of elongated conveyor members 88 are supported in end-to-end relation on the rollers 32, 34, 38, and 48, 50. The conveyor members 88 are substantially flat and have a generally rectangular transverse cross-section. The conveyor members 88 are connected by a relatively flat strap 89 engaged in slots 90 in the opposite ends of the conveyor members 88. The bars 89 are pivotally secured to the conveyor members 88 by means of pivot bolts 91 extending therethrough. The conveyor members 88 are engaged on their opposite side faces by the endless belts 83, 84 and are moved thereby due to the frictional engagement therebetween.

The conveyor members 88 are supported by the rollers 32, 34, 48, 50 and 38 for longitudinal movement and guided by the side plates 25, 26 in the straight stretches and by the rollers 39 in the curved sections.

A hook 92 is secured in depending relation to each end of the conveyor member 88 by means of a bolt 93.

A generally rectangular mink cage 94 is suspended from a pair of adjacent hooks 92 in one use of the invention so that the cages 94 can be moved through a series of stations (not shown) where the cages 94 are cleaned and the mink therein provided with food and water.

In Figures 11 and 12 a modified form of the invention is illustrated wherein conveyor members 88a are provided with offset tongues 89a which are adapted to be arranged in superposed relation, as seen in Figure 12. A pivot bolt 91a pivotally secures the tongues 89a together to permit the conveyor members 88a to move over a tortuous path. Each of the tongues 89a are provided with a transversely extending dowel pin 95 which is used to prevent splitting of the wood forming the tongues 89a. The conveyor members 88a are provided with vertically extending posts 96 which are secured to the conveyor members 88a by transversely extending dowel pins 97. The lower end of the posts 96 are provided with transversely extending dowel pins 98 loosely supported therein for engaging and supporting a load thereon.

While the conveyor 20 has been illustrated as applied to mink cages 94, it should be understood that they may be used in any position adapted to endless conveyor use.

Having thus described the preferred embodiments of the invention, it should be understood that numerous structural modifications and adaptations may be resorted to without departing from the scope of the appended claims.

What is claimed is:

1. An endless conveyor comprising a plurality of supporting members, a channel of inverted U-shaped cross sectional configuration carried by said supporting members, a plurality of horizontal axles spaced along the side walls of said channel and extending inwardly, rollers carried by said axles, an endless belt formed of a plurality of generally rectangular conveyor members pivotally interconnected in end-to-end relation and supported on said rollers for movement thereon in said channel, said conveyor members having relatively wide side faces, said channel forming a loop having closely adjacent spaced end portions forming an opening, a drive section for said conveyor members in said opening, said drive section comprising a pair of spaced parallel plates on opposite sides of said conveyor members, a plurality of axles extending vertically from said plates, rollers mounted on said axles in spaced parallel relation to said conveyor elements, endless belts extending about said rollers in frictional contact with the wide side faces of said conveyor members, and means for driving said endless belts.

2. A device as claimed in claim 1 wherein each of said conveyor members are provided with a depending hook positioned adjacent the opposite ends thereof.

3. A device as claimed in claim 1 wherein each of said conveyor members are provided with a depending post secured to said conveyor members adjacent each end thereof, and each of said posts are provided with a transversely extending support member for engaging and supporting a load thereon.

References Cited in the file of this patent

UNITED STATES PATENTS

| | | |
|---|---|---|
| 581,131 | Pancoast | Apr. 20, 1897 |
| 1,535,785 | Luce | Apr. 28, 1925 |
| 1,905,694 | Folly | Apr. 25, 1933 |
| 2,386,558 | Kleintop | Oct. 9, 1945 |